3,029,259
9α-HALO-4-PREGNENE-3,20 DIONES AND
DERIVATIVES THEREOF
Clarence G. Bergstrom, Chicago, and Raymond M. Dodson, Park Ridge, Ill., assignors to G. D. Searle & Co., Chicago, Ill., a corporation of Delaware
No Drawing. Filed Nov. 13, 1958, Ser. No. 773,560
13 Claims. (Cl. 260—397.3)

The present invention relates to a novel process for the preparation of Δ⁴-3-keto-9α-halo steroids by treatment of a Δ⁴-3-keto-11β-hydroxy steroid, a Δ⁴-3-keto-9α-hydroxy steroid or a Δ⁴,⁹⁽¹¹⁾-3-keto-steroid with a hydrogen halide in an organic solvent which is a proton acceptor. By this process there can be prepared valuable medicinal agents and particularly compounds of the general structural formula

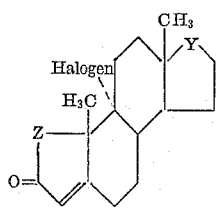

wherein Z is either an ethylene or vinylene radical and Y is a radical CO, CHOR, CH—CO—CH₃,

CH—CO—CH₂—OR,

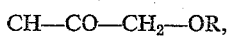

C(OH)—CO—CH₂OR, C(OR)—COCH₂—Halogen,

C(OR)—CO—CH₃ and CH—CO—CH₂—Halogen. R can represent a hydrogen or acyl radical and the acyl radical is preferably one of a hydrocarbon carboxylic acid of less than 9 carbon atoms. Examples of such acyl radicals are formyl, acetyl, propionyl, butyryl, valeryl, hexanoyl, heptanoyl, octanoyl, and branched-chain isomers thereof; these acyl radicals can also be cyclic as in the case of the cyclopentanecarbonyl, cyclohexanecarbonyl, cyclopentaneacetyl, cyclopentanepropionyl, cyclohexaneacetyl, benzoyl, methylbenzoyl, phenylacetyl, and isomers and homologs of the foregoing.

The substituent in the 9α-position can be a halogen such as bromine but preferably is fluorine or chlorine. In the case where the radical Y is of the type

—C(OH)—CO—CH₂OR compounds of high anti-inflammatory activity are obtained which have minimal undesirable side-effects. The corresponding compounds lacking the hydroxy group in the 17-position have been found to be potent mineralocorticoid drugs. In addition the pregnene compounds produced by this novel process are highly active progestational agents. The androstene derivatives, i.e. the 19-carbon steroids produced by the process of this invention having a carbonyl or a carbinol group in the 17-position, are androgenic and anabolic agents.

According to this invention, the starting material is contacted with an anhydrous hydrogen halide in an organic solvent which acts as a hydrogen acceptor. Various Lewis bases can be used for this purpose. For example, in the case of hydrogen fluoride, there can be used such cyclic amines as pyridine. In the case of hydrogen chloride, ethers such as dioxane have been found to be particularly useful.

Suitable starting materials are the 11β-hydroxy steroids, 9α-hydroxy steroids and Δ⁴,⁹⁽¹¹⁾ steroids. The mechanism of the reaction is such that the 11β-hydroxy group is lost during the formation of the 9α-halo compounds. A hydrogen ion adds to the 11β-hydroxy group to give an H₂O group with a positive charge. This arrangement is highly unstable and one molecule of water splits off leaving a carbonium ion in which the electron deficiency is concentrated about the 11 carbon atom. However, even this arrangement is unstable relative to one in which the electron deficiency is concentrated about the 9 carbon atom and added stability is achieved by transfer of a hydride radical from carbon atom 9 to carbon atom 11. This ionic 9-carbonium compound can be formed by the addition of a hydrogen ion to the 11-position of a Δ⁴,⁹⁽¹¹⁾-steroid. Finally, since the steroid molecule is deficient in electrons, it is now ready to act as a Lewis acid and accept an electron pair from the halide ion to form a co-ordinate covalent bond. A similar type of mechanism can be used to describe the formation of the 9α-halo derivatives from the 9α-hydroxy steroids by way of the same ionic 9-carbonium compound.

The reaction is conveniently carried out by treatment of the starting materials with a reagent comprising the hydrogen halide in a Lewis base, suitably within the temperature range of about 0–50° C. The crude 9α-halogenated reaction product is precipitated by the addition of water. The desired product can be obtained directly by purification through chromatographic fractionation on a silica gel column, or through crystillization from organic solvents. Alternatively, in those instances where a purified product is not readily obtained by these procedures, the crude reaction product can first be subjected to further chemical operations. Thus the entire crude product, which regularly contains some 9(11)-dehydro compound formed by the dehydration of the starting material, is reacted with N-bromoacetamide and aqueous perchloric acid in dioxane to convert the 9(11)-dehydro compound present in the mixture to the 9α-bromo-11β-hydroxy derivative. The latter compound is converted to the 9,11-epoxide by heating the entire crude product with potassium acetate in ethanol or aqueous ethanol. The crude product from this operation then contains the desired halo derivative and the 9,11-epoxide, which is sometimes more readily separable by chromatography than are the desired halo derivative and the 9(11)-dehydro compound present in the crude product after the initial treatment with hydrogen halide.

Compounds of this invention having the annular unsaturation of 1,4-pregnadiene are prepared by the dehydrogenation of the corresponding 4-pregnene derivative, for instance with selenium dioxide or selenious acid in a solvent consisting of tertiary butanol and a small quantity of acetic acid.

The present invention will appear more fully from the examples which follow. These examples are set forth by way of illustration only and are not to be construed as limiting the invention either in spirit or in scope. It will be apparent to those skilled in the art of organic synthesis that many modifications of materials and methods may be practiced without departing from this invention. In these examples temperatures are given in degrees centigrade (° C.) and quantities of materials in parts by weight.

The present application is a continuation-in-part of our copending application Serial No. 631,403, filed December 31, 1956, now abandoned.

*Example 1*

A reagent comprising a high concentration of hydrogen fluoride in pyridine is prepared as follows. A stream of anhydrous hydrogen fluoride is passed into 95 parts of pyridine contained in a large vessel with cooling. The temperature is preferably maintained beolw 50° C. The reagent prepared in this manner contains about 74.8% of hydrogen fluoride and about 25.2% of pyridine.

To 108 parts of a hydrogen fluoride-pyridine reagent, prepared as described hereinabove and then cooled with an external ice bath is added 9.4 parts of 11β,17α-dihydroxy-21-acetoxy-4-pregnene-3,20-dione. The solution gradually becomes deep red in color. After 4 hours the reaction mixture is poured into a stirred mixture of 2300 parts of ethyl acetate and 1000 parts of ice water. The ethyl acetate phase is separated, washed successively with water and sufficiently saturated sodium bicarbonate solution to give an alkaline reaction and finally again with water to neutrality. The solution is then dried over sodium sulfate, filtered and concentrated to dryness. A semi-crystalline product is obtained.

To a solution of the crude product in 490 parts of purified dioxane there is added all at once with stirring, 5.1 parts of N-bromoacetamide followed, 1 minute later, by 47.5 parts of a 1 molar aqueous solution of perchloric acid. The solution is allowed to stand at about 25° C. for 20 minutes, following which 250 parts of a 2 percent sodium sulfite solution are added, with mixing. The mixture is stirred with 2500 parts of ethyl acetate and 1000 parts of water, and the ethyl acetate phase, after being washed, is dried and vacuum distilled.

The gummy product is dissolved in 640 parts of anhydrous ethanol. Potassium acetate (26.5 parts) is added and the mixture is heated under reflux for 50 minutes. Water (185 parts) is added to the hot solution, and the solvent is vacuum distilled and concentrated to about one-fifth of its former volume. The residual solution is cooled and further diluted with 800 parts of water to cause the separation of a gummy product. This solution is extracted with 2700 parts of benzene, and the separated benzene solution is washed twice with water, dried, and vacuum distilled leaving a brown syrup as a residue. The brown syrup is taken up in 900 parts of benzene and poured onto a chromatography column containing silica gel. The column is eluted with benzene and with mixtures of benzene and ethyl acetate containing gradually increasing proportions of ethyl acetate.

Elution with a 25% solution of ethyl acetate in benzene yields 9α-fluoro-17α-hydroxy-21-acetoxy-4-pregnene-3,20-dione, which upon recrystallization from acetone melts at about 264–267° C. The compound shows an ultraviolet maximum at 238 millimicrons with a molecular extinction coefficient of about 18,200. It also shows absorption maxima in the infrared spectrum at 2.92, 5.72, 5.82, 6.08, 7.07, 7.33, 8.05, 9.15, 9.53, 10.67, 11.27, 11.47, 11.82 and 12.94 microns.

*Example 2*

To 100 parts of purified dioxane saturated with hydrogen chloride a solution of 2 parts of hydrocortisone acetate is added and the mixture is maintained at room temperature for 24 hours. The solvent is vacuum distilled and the residue is taken up in 180 parts of ethyl acetate. The ethyl acetate solution is washed with saturated sodium bicarbonate solution and then with water, filtered through anhydrous sodium sulfate and concentrated under vacuum. The yellowish brown foam obtained is taken up in benzene and applied to a chromatography column containing silica gel. The column is washed with benzene and benzene solutions containing increasing amounts of ethyl acetate. Elution with a 20% solution of ethyl acetate in benzene and recrystallization from an acetone-petroleum ether solution gives 9α-chloro-21-acetoxy-17α-hydroxy-4-pregnene-3,20-dione in prisms melting at about 203–205° C. The product shows an ultraviolet maximum at 240 millimicrons with an extinction coefficient of about 16,000.

*Example 3*

To a stirred solution of 10 parts of 9α-fluoro-17α-hydroxy-21-acetoxy-4-pregnene-3,20-dione in 1600 parts of methanol maintained in a nitrogen atmosphere, there is added over a period of 10 minutes a 0.1 molar solution of sodium hydroxide containing a total of 0.98 part of sodium hydroxide. After an additional 5 minutes there are added 10 parts of acetic acid followed by 4000 parts of water. The mixture is refrigerated for about 2 hours, and the crystalline product which separates is collected on a filter. Upon purification by recrystallization from methanol there is obtained 9α-fluoro-17α,21-dihydroxy-4-pregnene-3,20-dione melting at about 235–238° C. The specific rotation in chloroform is +105.5°. This compound has an ultraviolet absorption maximum at 238 millimicrons with a molecular extinction coefficient of about 17,400. Infrared absorption maxima appear at about 2.94, 5.82, 5.98, 7.00, 8.03, 9.10, 9.53, 11.08, and 11.35 microns.

The 9α-fluoro-17α,21-dihydroxy-4-pregnene-3,20-dione can also be prepared by the direct treatment of 11β,17α,21-trihydroxy-4-pregnene-3,20-dione with the hydrogen fluoride-pyridine reagent.

21-acyl esters of this compound may be prepared as follows. A solution of 2 parts of 9α-fluoro-17α,21-dihydroxy-4-pregnene-3,20-dione is dissolved in 25 parts of warm pyridine and cooled to room temperature. This solution is then treated, illustratively, with propionic anhydride, β-cyclopentylpropionyl chloride, or benzoyl chloride. The reaction mixture is allowed to stand for 24 hours, after which the reaction product is precipitated by the gradual addition of about 200 parts of water. The product is collected on a filter and washed. In this manner there is obtained 9α-fluoro-17α-hydroxy-21-propionoxy-4-pregnene-3,20-dione, 9α-fluoro-17α-hydroxy-21-(β-cyclopentylpropionoxy)-4-pregnene-3,20-dione, or 9α-fluoro-17α-hydroxy-21-benzyloxy-4-pregnene-3,20-dione, respectively.

*Example 4*

To a solution of 300 parts of hydrogen fluoride-pyridine reagent, cooled to 0° C., are added 30 parts of hydrocortisone. The solution is allowed to stand at 0° C. for 4 hours and then is poured into 2250 parts of ethyl acetate and 1000 parts of water. The organic layer is separated, washed successively with water, sodium bicarbonate solution and again with water, dried over sodium sulfate, filtered and vacuum distilled to dryness. The residue containing 9α-fluoro-17α,21-dihydroxy-4-pregnene-3,20-dione and 17α,21-dihydroxy-4,9(11)-pregnadiene-3,20-dione, is not purified, but is used directly in the next step of this example.

A solution of 27 parts of the foregoing crude mixture in 186 parts of pyridine is cooled to 0° C. Then 15.9 parts of methanesulfonyl chloride are added and the mixture is stirred for 2 hours. At the end of this time 1000 parts of water are slowly added. The gummy precipitate is collected by filtration and triturated in toluene. The remaining solid is collected by filtration. It contains the 21-methanesulfonate of 9α-fluoro-17α,21-dihydroxy-4-pregnene-3,20-dione.

This residue is taken up in 342 parts of acetone and a solution of 27 parts of sodium iodide in 213 parts of acetone is added. The mixture is refluxed for 1 hour. After cooling to room temperature, the precipitate which has formed is removed by filtration and the filtrate is vacuum distilled to near dryness. The resulting residue contains 9α-fluoro-17α-hydroxy-21-iodo-4-pregnene-3,20-dione.

This residue is taken up in 565 parts of glacial acetic acid and stirred at room temperature for 90 minutes. The mixture is then divided into 2 equal portions. The first portion is poured into 2250 parts of ethyl acetate and 1000 parts of water. The organic layer is separated, washed successively with water, sodium bicarbonate solution, and again with water, dried over sodium sulfate, filtered and vacuum distilled to dryness to yield a mixture of 9α-fluoro-17α-hydroxy-4-pregnene-3,20-dione and 17α-hydroxy-4,9(11)-pregnadiene-3,20-dione.

To a solution of 11 parts of this mixture in 570 parts of dioxane is added 6.6 parts of N-bromoacetamide followed by 55 parts of normal perchloric acid. The solution is allowed to stand at room temperature for 10 minutes and then 176 parts of a 2% sodium sulfite solution and sufficient water are added to make the solution up to about 2200 parts. The gummy solid is collected by filtration and washed with water. A solution of 8 parts of this compound in 127 parts of ethanol is heated to reflux under a nitrogen atmosphere. Then 8 parts of potassium acetate in 22.4 parts of ethanol are added portionwise and the mixture is refluxed for 2 hours. Upon dilution with water and cooling, a precipitate forms which is collected by filtration. The precipitate is taken up in benzene and applied to a chromatography column containing silica gel. The column is developed with benzene and benzene solutions containing increasing amounts of ethyl acetate. Upon elution with a 15% solution of ethyl acetate in benzene and recrystallization from methanol there is obtained pure 9α-fluoro-17α-hydroxy-4-pregnene-3,20-dione melting at about 278° C. dec.

The second portion of the acetic acid solution obtained from the reduction of the 21-iodo compound containing 9α-fluoro-17α-hydroxy-4-pregnene-3,20-dione is isolated as described above. To a solution of 9.4 parts of 9α-fluoro-17α-hydroxy-4-pregnene-3,20-dione and 480 parts of glacial acetic acid, under a nitrogen atmosphere, is added 3.8 parts of p-toluenesulfonic acid followed by 48 parts of acetic anhydride. The mixture is then stirred for 15 hours and poured slowly into 2000 parts of ice and water. The precipitate is collected by filtration and washed with water. It is then dissolved in 374 parts of methanol and nitrogen is bubbled through the solution for 15 minutes. After adding 4.8 parts of concentrated hydrochloric acid, the solution is allowed to stand at room temperature for 2 hours and then is diluted with water. The solid is collected by filtration. This compound, 9α-fluoro-17α-acetoxy-4-pregnene-3,20-dione is purified in the manner described above, except that it is obtained from the chromatography column upon elution with a 10% solution of ethyl acetate in benzene. The compound shows a melting point of about 242–243° C.

*Example 5*

A solution of 10 parts of 9α-fluoro-17α-hydroxy-21-acetoxy-4-pregnene-3,20-dione, 3.2 parts of selenious acid, 800 parts of purified tertiary butyl alcohol and 10 parts of acetic acid is stirred and heated under reflux in a nitrogen atmosphere for 24 hours. At approximately 12 hours after heating is begun an additional portion of 3.2 parts of selenious acid is added. The cooled mixture is diluted with 9000 parts of ethyl acetate and filtered from a small amount of insoluble matter. The filtrate is washed with a total of 12,000 parts of saturated sodium bicarbonate solution in two equal portions and with a total of 10,000 parts of water in two equal portions, after which the separated organic phase is dried and vacuum distilled. The gummy residue is crystallized by the addition of a mixture of acetone and petroleum ether, and the crystalline product thus obtained is recrystallized from a mixture of acetone and petroleum ether.

The crude product can also be purified by fractionation on a chromatography column containing silica gel. The residue is taken up in a benzene solution and applied to the chromatography column. The column is developed with benzene and benzene solutions containing increasing amounts of ethyl acetate. Elution with a 15% solution of ethyl acetate solution in benzene and subsequent recrystallization yields 9α-fluoro-17α-hydroxy-21-acetoxy-1,4-pregnadiene-3,20-dione melting at 247–249° C. The compound has an ultraviolet absorption maximum at 239.5 millimicrons with a molecular coefficient of about 15,800. It shows infrared absorption maxima at about 2.88, 5.72, 5.80, 6.00, 6.17, 7.08, 7.28, 8.05, 9.16, 9.55, and 11.18 microns.

*Example 6*

Ten parts of 9α-fluoro-17α-hydroxy-21-acetoxy-1,4-pregnadiene-3,20-dione as obtained in Example 5, is dissolved in 1600 parts of methanol. Over a period of 10 minutes, while this solution is stirred and maintained in a nitrogen atmosphere, there is added a 0.1 molar solution of sodium hydroxide containing a total of 1.0 part of sodium hydroxide. The solution is allowed to stand for an additional 5 minutes, after which there are added 10 parts of acetic acid followed by 4000 parts of water. After the mixture is chilled, the product is collected on a filter and washed with water. This compound is purified by recrystallization from methanol. In this manner there is obtained 9α-fluoro-17α,21-dihydroxy-1,4-pregnadiene-3,20-dione.

*Example 7*

To a solution of 6.3 parts of 9α-fluoro-17α,21-dihydroxy-4-pregnene-3,20-dione as obtained in Example 3, in a mixture of 600 parts of acetic acid and 600 parts of water is added 108 parts of sodium bismuthate. The resulting slurry is stirred at about 25° C., for 16 hours, after which it is poured into a mixture of 9000 parts of ethyl acetate and 5000 parts of water. The entire mixture is stirred and then filtered through diatomaceous earth. The filter cake is washed with 9000 parts of ethyl acetate, which is added to the filtrate, and the separated ethyl acetate phase is washed with water, with saturated sodium bicarbonate solution, and finally with several portions of water. The ethyl acetate solution is dried and vacuum distilled. The gummy or semi-crystalline residue is purified by fractionation on a silica gel column, or preferably by recrystallization from an organic solvent. After recrystallization from a mixture of acetone and petroleum ether there is obtained 9α-fluoro-4-androstene-3,17-dione which melts at about 227–228° C. The compound has infrared absorption maxima at about 5.75, 6.00, 7.46, 8.05, 9.60, 9.75, 11.28, and 11.56 microns. It also exhibits an ultraviolet absorption maximum at 237 millimicrons, with a molecular extinction coefficient of about 17,800.

The analogous 9α-fluoro-1,4-androstadiene-3,17-dione is obtained by the oxidation of 9α-fluoro-17α,21-dihydroxy-1,4-pregnadiene-3,20-dione as obtained in Example 6, with sodium bismuthate in the same manner.

The 9α-fluoro-4-androstene-3,17-dione can also be prepared in the following manner. A solution of 0.5 part of 11β-hydroxy-4-androstene-3,17-dione in 10 parts of hydrogen fluoride-pyridine reagent is maintained at room temperature for 29 hours. The reaction mixture becomes a dark red-brown in color. The solution is partitioned between 90 parts of ethyl acetate and 50 parts of water. The ethyl acetate solution is washed successively with water, saturated sodium bicarbonate solution and again with water; dried over anhydrous sodium sulfate, filtered and vacuum distilled, leaving a yellow crystalline product. The yellow crystals are taken up in benzene and applied to a chromatography column containing silica gel. The column is developed with benzene and benzene solutions containing increasing amounts of ethyl acetate. Elution with a 10% solution of ethyl acetate in benzene and recrystallization from acetone and petroleum ether gives 9α-fluoro-4-androstene-3,17-dione with physical properties identical to those listed in the first paragraph of this example.

*Example 8*

A solution of 1.2 parts of 11β-hydroxytestosterone 17-acetate in 11 parts of hydrogen fluoride-pyridine reagent is maintained at 0° C. for 4 hours. During the reaction time the initial yellowish brown color of the solution changes to reddish brown. The reaction mixture is then partitioned between 225 parts of ethyl acetate and 100 parts of water. The ethyl acetate solution is washed successively with water, saturated sodium bicarbonate solution and again with water, filtered through anhydrous sodium sulfate and vacuum distilled. The pale yellow syrup obtained is recrystallized from an acetone-petroleum ether solution to yield 9α-fluoro-testosterone acetate melting at about 197.5–198.5° C. The compound shows an ultraviolet maximum at 237.5 millimicrons with an extinction coefficient of about 16,800. The specific rotation in 0.8% chloroform solution is +21°.

*Example 9*

One part of corticosterone acetate is added to 10 parts of hydrogen fluoride-pyridine reagent maintained at room temperature for 2 hours. The solution is then partitioned between 180 parts of ethyl acetate and 50 parts of water. The ethyl acetate solution is washed successively with water, saturated sodium bicarbonate solution and again with water, dried over anhydrous sodium sulfate, filtered and vacuum distilled. The resulting yellow syrup is taken up in an acetone-petroleum ether solution. The solution is filtered from a small amount of insoluble material, and evaporated to yield a pale yellow gum. This gum is dissolved in 20 parts of purified dioxane and a solution of 0.4 part of N-bromoacetamide in 4 parts of normal perchloric acid is added. After 20 minutes at room temperature, 25 parts of a 2% sodium bisulfite solution are added. The resulting mixture is partitioned between 180 parts of ethyl acetate and 100 parts of water. The ethyl acetate solution is washed with water, saturated sodium bicarbonate solution and again with water, filtered through anhydrous sodium sulfate and concentrated to dryness by vacuum distillation.

The resulting yellow gum is refluxed with 40 parts of absolute ethanol containing 2 parts of potassium acetate for an hour. Most of the solvent is then vacuum distilled and the residue is diluted with 50 parts of water and extracted with 180 parts of benzene. The benzene solution is washed with water and then with saturated sodium chloride solution, dried over anhydrous sodium sulfate and filtered through a filter aid. The benzene solution is then applied to a chromatography column containing silica gel. The column is eluted with benzene solutions containing increasing amounts of ethyl acetate. Elution with a 15% solution of ethyl acetate in benzene yields 9α-fluoro - 21 - acetoxy-4-pregnene-3,20 - dione, which upon recrystallization from a mixture of acetone-petroleum ether melts at about 186–188° C. The compound exhibits a maximum in the ultraviolet spectrum at 238 millimicrons with an extinction coefficient of 17,900. The 9α-fluoro - 21 - hydroxy - 4 - pregnene-3,20-dione may be obtained by the procedure as outlined in Example 6.

*Example 10*

A solution of 1 part of 11β-hydroxyprogesterone in 10 parts of hydrogen fluoride-pyridine reagent is maintained at 0° C. for 4 hours. During the reaction period the mixture changes from a yellowish brown to a reddish brown color. The solution is then diluted with 50 parts of water and extracted with 180 parts of ethyl acetate. The ethyl acetate solution is washed with water, saturated sodium bicarbonate solution and again with water, dried over sodium sulfate and filtered through a filter aid. Upon distillation of the filtrate there is obtained a pale yellow oil. This oil is purified by crystallization from an acetone-petroleum ether solution to yield 9α-fluoroprogesterone melting at about 196–200° C. The compound has a maximum absorption in the ultraviolet at 237.5 millimicrons with an extinction coefficient of 17,400. The specific rotation in an 0.54% solution of chloroform is +161°.

*Example 11*

A solution of 3 parts of 21-fluoro-11β,17α-dihydroxy-4-pregnene-3,20-dione and 80 parts of hydrogen fluoride-pyridine reagent is maintained at −20° C. for 17 hours. The solution is then poured into 500 parts of ice cold water. The resulting precipitate is filtered and recrystallized from acetone to yield 9α,21-difluoro-17α-hydroxy-4-pregnene-3,20-dione melting at about 265–268° C. with decomposition. The compound shows a maximum in the ultraviolet at 238 millimicrons with an extinction coefficient of 17,300.

A suspension is made by adding 0.2 part of 9α,21-difluoro-17α-hydroxy - 4 - pregnene - 3,20 - dione to a mixture of 8 parts of glacial acetic acid, 0.8 part of acetic anhydride and 0.06 part of p-toluenesulfonic acid monohydrate. This suspension is stirred under nitrogen for 18 hours. Then an additional 8 parts of acetic acid, 0.8 part of acetic anhydride, and 0.06 part of p-toluenesulfonic acid monohydrate are added. The mixture is stirred for 5 hours, and after standing for 18 hours, it is poured gradually with stirring into about 250 parts of ice water. The resulting slimy suspension is extracted with ethyl acetate. The extract is washed with saturated sodium bicarbonate solution and with water, dried over sodium sulfate and vacuum distilled. The clear gummy residue is dissolved in 8 parts of methanol. The solution is placed under nitrogen and 0.1 part of concentrated hydrochloric acid are added. After 3 hours at room temperature, the solution is cooled and water is added gradually to bring the volume to 40 parts. The crystalline product which precipitates is dissolved in benzene and applied to a chromatography column containing silical gel. The column is developed with benzene and benzene solutions containing increasing amounts of ethyl acetate. Elution with a 7% ethyl acetate in benzene solution yields 9α,21-difluoro-17α-acetoxy-4-pregnene-3,20-dione, which upon recrystallization from acetone, melts at about 232–233.5° C.

Substitution of an equimolar amount of hydrogen chloride-dioxane reagent for the hydrogen fluoride-pyridine reagent in this example affords 9α-chloro-21-fluoro-17α-hydroxy-4-pregnene-3,20-dione.

An alternative synthesis for 9α,21-difluoro-17α-hydroxy-4-pregnene-3,20-dione proceeds as follows. To a solution of 3.5 parts of benzenesulfonyl chloride and 0.25 part of collidine is added 0.25 part of 9α-fluoro-17α,21-dihydroxy - 4 - pregnene - 3,20 - dione. The solution is maintained at room temperature for 19 hours and then it is poured onto a chromatography column containing silica gel. The column is developed with benzene and benzene solutions containing increasing amounts of ethyl acetate. Elution with a 50% solution of ethyl acetate in benzene affords 9α-fluoro-21-chloro-17α-hydroxy-4-pregnene-3,20-dione.

The crude compound is refluxed with 45 parts of acetone and 1 part of sodium iodide for 1 hour. Most of this solvent is vacuum distilled and the solution is diluted with 100 parts of water. The solution is then extracted with 250 parts of benzene. The benzene solution is washed with 100 parts of dilute sodium thiosulfate solution and with 100 parts of water. The solution is dried and vacuum distilled to yield 9α-fluoro-21-iodo-17α-hydroxy-4-pregnene-3,20-dione.

The crude iodo compound is dissolved in 20 parts of acetonitrile and placed in a Soxhlet extractor with a thimble containing 1 part of silver fluoride. The solution is refluxed for 17 hours, and then partitioned between 225 parts of ethyl acetate and 125 parts of water. The ethyl acetate solution is washed with water and filtered through anhydrous sodium sulfate. Upon vacuum distillation of the solvent there is obtained 9α,21-difluoro-17α-hydroxy-4-pregnene-3,20-dione.

Substitution of an equimolar amount of the appropriate acid and acid anhydride for acetic acid and acetic anhydride in the esterification process described above yields the corresponding 17-position ester. These include such as propionic, butyric, and β-cyclopentanepropionic esters.

*Example 12*

A solution of 2 parts of 11β-hydroxytestosterone in 20 parts of hydrogen fluoride-pyridine reagent is maintained at room temperature for 4 hours. The solution is then diluted with 50 parts of water and extracted with 150 parts of ethyl acetate. The extract is washed with aqueous sodium bicarbonate and water and vacuum distilled. The residue is taken up in benzene and applied to a chromatography column containing silica gel. The column is developed with benzene solutions containing increasing amounts of ethyl acetate. Elution with a 15% solution of ethyl acetate in benzene and recrystallization from a solution of acetone and petroleum ether affords 9α-fluorotestosterone, melting at about 206–207° C.

*Example 13*

A solution of 2 parts of 9α-hydroxy-4-androstene-3,17-dione and 18.5 parts of hydrogen fluoride-pyridine reagent is maintained at +2° C. for 7 hours. The reaction mixture is then poured into a mixture of 450 parts of ethyl acetate and 250 parts of water. The organic layer is separated, washed successively with water, saturated sodium bicarbonate solution, and again with water, dried over sodium sulfate, and distilled to dryness under vacuum. The crystalline residue is taken up in benzene and applied to a chromatography column containing silica gel. The column is developed with benzene and benzene solutions containing increasing amounts of ethyl acetate. Upon elution with an 8% solution of ethyl acetate in benzene two fractions are obtained. The first contains predominantly 4.9(11)-androstadiene-3,17-dione. Next there is eluted 9α-fluoro-4-androstene-3,17-dione, which upon recrystallization from a mixture of acetone and petroleum ether, melts at about 228–229° C. dec.

*Example 14*

A solution of 0.2 part of 9α-fluoro-17β-hydroxy-4-androstene-3-one in 2 parts of pyridine and 2 parts of propionic anhydride is allowed to stand at room temperature for 15 hours and then is poured into ice water. The crystalline product is collected by filtration and upon recrystallization from a mixture of acetone and petroleum ether there is obtained 9α-fluoro-17β-propionyloxy-4-androsten-3-one melting at about 163–165° C. It has an absorption maximum in the ultraviolet at 238 millimicrons with an extinction coefficient of about 17,300.

*Example 15*

A solution of 2 parts of 17α-hydroxy-21-acetoxy-4,9(11)-pregnadiene-3,20-dione in 20 parts of hydrogen fluoride-pyridine reagent is maintained at about −2° C. for 4 hours. The solution is then poured into 315 parts of ethyl acetate and 100 parts of water. The organic layer is separated, washed successively with water, saturated sodium bicarbonate solution, and again with water, dried over anhydrous sodium sulfate and distilled to dryness under reduced pressure. The resulting crystalline residue is dissolved in 52 parts of warm dioxane, cooled, and then 1 part of N-bromoacetamide is added followed by 10 parts of normal perchloric acid. After standing for 20 minutes at room temperature, 50 parts of a 2% solution of sodium sulfite are added and the solution is partitioned between 225 parts of ethyl acetate and 100 parts of water. The organic layer is separated, shaken with 100 parts of water and an emulsion results. Upon addition of 25 parts of saturated sodium chloride solution the layers separate. The organic layer is separated, washed with water, dried over anhydrous sodium sulfate and vacuum distilled to about 20 parts. The solution is added to about 45 parts of ethyl acetate and then dissolved in benzene. The benzene solution is applied to a chromatography column containing silica gel. The column is developed with benzene and benzene solutions containing increasing amounts of ethyl acetate. Upon elution with a 20% solution of ethyl acetate in benzene and recrystallization from acetone and methanol there is obtained 9α-fluoro - 17α - hydroxy - 21 - acetoxy - 4 - pregnene -3,20-dione melting at about 255–262° C. dec.

What is claimed is:
1. A compound of the structural formula

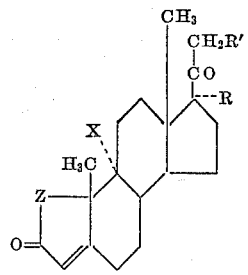

wherein X is a halogen of atomic number less than 18, Z is a member of the class consisting of ethylene and vinylene, R is a member of the class consisting of hydrogen, hydroxy and O—CO—(lower alkyl) and R' is a member of the class consisting of hydrogen, halogen, hydroxy and O—CO—(lower alkyl) radicals.

2. The process for the preparation of a compound of the structural formula

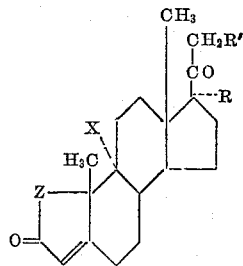

wherein R, R', X and Z are defined as in claim 1, which comprises mixing a member of the class consisting of compounds of the structural formulas

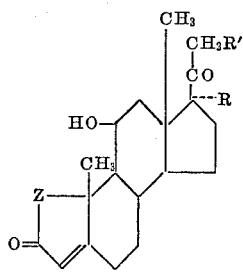

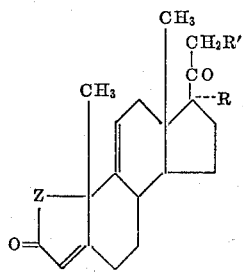

and

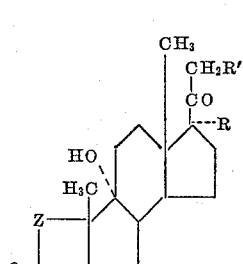

with the corresponding anhydrous hydrogen halide of the formula HX in an anhydrous organic solvent capable of acting as a Lewis base 3. 9α-fluoro-17α,21-dihydroxy-4-pregnene-3,20-dione.
4. A compound of the structural formula

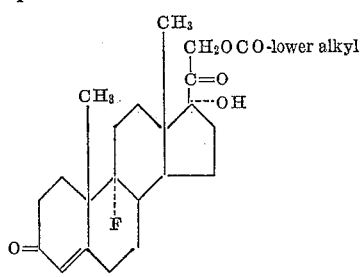

5. 9α - fluoro - 17α - hydroxy - 21 - acetoxy - 4 - pregnene-3,20-dione.
6. 9α - fluoro - 17α,21 - dihydroxy - 1,4 - pregnadiene-3,20-dione.
7. A compound of the structural formula

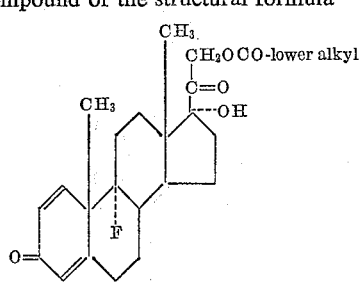

8. 9α - fluoro - 17α - hydroxy - 21 - acetoxy - 1,4-pregnadiene-3,20-dione.
9. 9α-fluoro-4-pregnene-3,20-dione.
10. 9α-fluoro-17α-hydroxy-4-pregnene-3,20-dione.
11. 9α-fluoro-17α-acetoxy-4-pregnene-3,20-dione.
12. 9α-fluoro-21-acetoxy-4-pregnene-3,20-dione.
13. 9α,21-difluoro-17α-acetoxy-4-pregnene-3,20-dione.

References Cited in the file of this patent

UNITED STATES PATENTS

| | | |
|---|---|---|
| 2,382,706 | Reichstein | Oct. 23, 1945 |
| 2,409,798 | Reichstein | Oct. 22, 1946 |
| 2,837,464 | Nobile | June 3, 1958 |
| 2,838,498 | Magerlein et al. | June 10, 1958 |
| 2,857,404 | Gash | Oct. 21, 1958 |
| 2,861,920 | Dale et al. | Nov. 25, 1958 |

OTHER REFERENCES

Fried et al.: "Recent Progress in Hormone Research," vol. XI, (1955) pp. 149–174, pp. 167–174 relied on.

Fieser et al.: "Natural Prod. Related to Phenanthrene," 3rd ed., Reinhold Pub. Corp., N.Y., (1949), pages 407 and 429 relied on.

Tannhauser et al.: J. Am. Chem. Soc. 78, 2658–2659, (1956).

UNITED STATES PATENT OFFICE
CERTIFICATE OF CORRECTION

Patent No. 3,029,259                                        April 10, 1962

Clarence G. Bergstrom et al.

It is hereby certified that error appears in the above numbered patent requiring correction and that the said Letters Patent should read as corrected below.

Column 2, line 25, for "crystillization" read -- crystallization --; line 69, for "beolw" read -- below --; column 4, line 29, for "hydrovy" read -- hydroxy --; column 7, line 3, for "+21°" read -- +71° --; line 70, for "—20° C." read -- —2° C. --; column 9, line 26, for "4.9(11)" read -- 4,9(11) --.

Signed and sealed this 19th day of March 1963.

(SEAL)
Attest:

ESTON G. JOHNSON

Attesting Officer

DAVID L. LADD

Commissioner of Patents